W. J. A. LONDON.
SHAFT PACKING.
APPLICATION FILED SEPT. 13, 1917.

1,273,634.

Patented July 23, 1918.

Inventor,
William J. A. London,
by Albert G. Davis
His Attorney.

UNITED STATES PATENT OFFICE.

WILLIAM J. A. LONDON, OF SPRINGFIELD, MASSACHUSETTS, ASSIGNOR TO GENERAL ELECTRIC COMPANY, A CORPORATION OF NEW YORK.

SHAFT-PACKING.

1,273,634.

Specification of Letters Patent.

Patented July 23, 1918.

Application filed September 13, 1917. Serial No. 191,145.

*To all whom it may concern:*

Be it known that I, WILLIAM J. A. LONDON, a subject of the King of Great Britain, residing at Springfield, in the county of Hampden, State of Massachusetts, have invented certain new and useful Improvements in Shaft-Packings, of which the following is a specification.

The present invention relates to shaft packings and particularly to such packings which comprise a ring formed of two or more segments which fit around the shaft and are held in position by an encircling spring, usually termed a gland spring, or a garter spring, the purpose of this arrangement being to yieldingly hold the packing to the shaft so as to permit the packing to open up radially.

The object of my invention is to provide an improved arrangement of packing wherein when the packing ring is opened up radially the stretch of the garter spring will be distributed uniformly throughout the entire length of the spring, and not be confined to certain points which has been a difficulty often met with heretofore.

For a consideration of what I believe to be novel and my invention, attention is directed to the accompanying specification and the claims appended thereto.

In the present instance the invention is shown in connection with the packing for a diaphragm of an elastic fluid turbine, but it will, of course, be understood that it is of general application.

Figure 1:
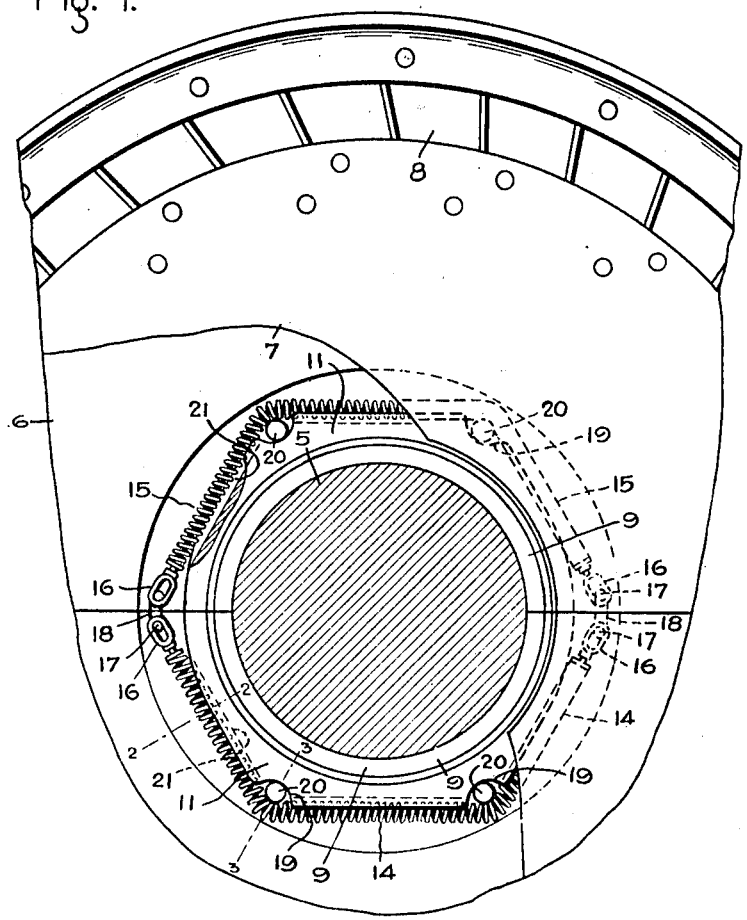
Figures 2, 3, 4:
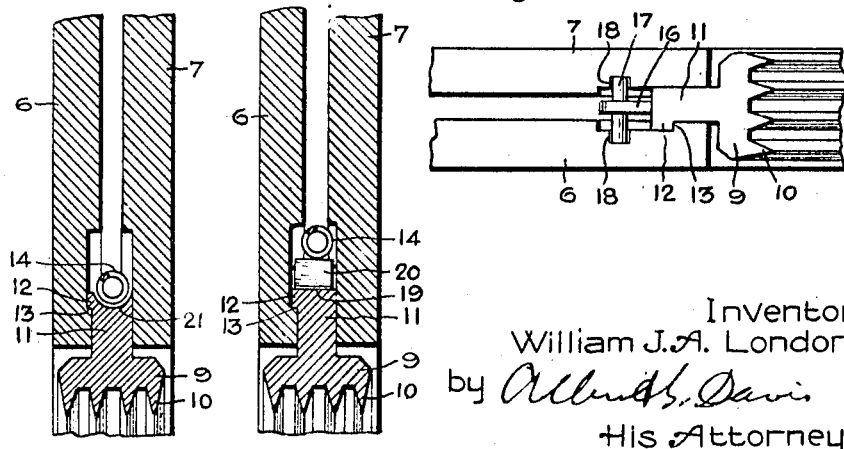

In the drawing, Figure 1 is a side elevation of a portion of a diaphragm of an elastic fluid turbine with my improved packing applied thereto; Fig. 2 is a section taken on line 2—2, Fig. 1; Fig. 3 is a section taken on line 3—3, Fig. 1, and Fig. 4 is a plan view looking down on one of the half-sections of the diaphragm.

Referring to the drawing, 5 indicates a rotating shaft surrounding which is a stationary diaphragm comprising two spaced annular plates 6 and 7, at the periphery of which are diaphragm nozzles 8. In the annular opening between the shaft and the plates is arranged a packing comprising a ring 9 having projections 10 which closely surround the shaft, and a collar 11 which projects between the two plates 6 and 7. The collar is provided with a projection 12 on one side which engages a ledge 13 on the plate 6 to position the packing and to limit its movement toward the shaft. Surrounding the collar is a coiled spring which yieldingly presses the packing toward the shaft. In the present instance the diaphragm is shown as being split in a horizontal plane and the packing is shown as comprising an upper half and a lower half, each provided with a separate spring section 14 and 15. Each half of the packing may be formed in one or more sections as found desirable. The ends of the spring sections 14 and 15 are provided with links 16 which engage pins 17 supported in slots 18 in the respective halves of the diaphragm. In each half of the collar 11 at spaced points are formed transverse slots 19 in which are rollers 20, and between slots 19 the edge of the collar 11 is cut away, as indicated at 21, to such an extent that the spring does not directly engage the collar. It will thus be seen that each spring section is supported only at spaced points, being fastened at its ends and supported on the rollers 20. The upper half of the packing is yieldingly pressed down toward the shaft by its spring section, and the lower half is yieldingly pressed up toward the shaft, being, in fact, suspended or hung on the spring.

With the above described arrangement, wherever, for any reason, the packing is opened up radially, as, for example, due to expansion of the shaft, vibration, or other causes, the spring sections, since they are supported between their ends only at spaced points and on rollers, will give throughout their entire length. In other words, the stretch is distributed throughout the length of the spring. By this means a uniform action of the spring on the segments of the packing is obtained so that the packing will be pressed toward the shaft equally in all directions. Also, the life of the spring will be much longer, and it will not be liable to injury from being stretched entirely at only one or more points.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with two relatively movable members, of a packing between them comprising a plurality of segments carried by one of said members, a spring means surrounding said segments, and circumferentially movable means on the segments for supporting the spring means at spaced points.

2. The combination with a shaft, of a packing comprising a plurality of segments which surround the shaft and form a ring, rollers located at spaced points on said segments, and a garter spring which engages the rollers and presses the packing segments toward the shaft.

3. The combination with a shaft and a member having an opening through which the shaft projects, of a packing between the shaft and the member comprising upper and lower packing segments which surround the shaft, rollers carried at spaced points on each packing segment, and a spring for each packing segment which surrounds the same and has its ends connected to said member, said springs engaging said rollers and being held out of direct contact with the packing segments thereby.

4. The combination with a shaft of a packing comprising a plurality of segments, circumferentially movable members located at spaced points on said segments, and spring means which engages said members and presses the packing segments toward the shaft.

In witness whereof I have hereunto set my hand this tenth day of September, 1917.

WILLIAM J. A. LONDON.